(12) United States Patent
Ouchi et al.

(10) Patent No.: US 7,129,945 B2
(45) Date of Patent: Oct. 31, 2006

(54) IMAGE GENERATION METHOD, PROGRAM AND INFORMATION STORAGE MEDIUM

(75) Inventors: Satoru Ouchi, Yokohama (JP); Yuichiro Okamura, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 707 days.

(21) Appl. No.: 10/206,339

(22) Filed: Jul. 29, 2002

(65) Prior Publication Data

US 2003/0020716 A1    Jan. 30, 2003

(30) Foreign Application Priority Data

Jul. 30, 2001   (JP)   .............................. 2001-230077

(51) Int. Cl.
*G06T 15/10*   (2006.01)
(52) U.S. Cl. ........................ 345/427; 345/426; 345/473
(58) Field of Classification Search ..................... None
See application file for complete search history.

(56) References Cited

U.S. PATENT DOCUMENTS

| 5,831,620 | A | * | 11/1998 | Kichury, Jr. ................. 345/419 |
| 5,933,146 | A | * | 8/1999 | Wrigley ....................... 345/420 |
| 5,977,981 | A | * | 11/1999 | Brown ........................ 345/581 |
| 6,121,977 | A | * | 9/2000 | Arai et al. ................... 345/619 |
| 6,157,387 | A | * | 12/2000 | Kotani ........................ 345/589 |
| 6,304,267 | B1 | * | 10/2001 | Sata ........................... 345/427 |
| 6,307,564 | B1 | * | 10/2001 | Kawakami .................... 345/474 |
| 6,559,854 | B1 | * | 5/2003 | Oka et al. .................... 345/582 |
| 6,574,376 | B1 | * | 6/2003 | Shiota et al. ................. 382/293 |
| 6,765,589 | B1 | * | 7/2004 | Georgiev et al. ............. 345/646 |
| 6,781,600 | B1 | * | 8/2004 | Anwar ........................ 345/629 |
| 6,784,882 | B1 | * | 8/2004 | Sugiyama .................... 345/419 |
| 6,850,242 | B1 | * | 2/2005 | Saito .......................... 345/582 |
| 2003/0038800 | A1 | * | 2/2003 | Kawahara ................... 345/420 |

OTHER PUBLICATIONS

"A Model for Anisotropic Reflection", Pierre Poulin, Alain Flurnier, Computer Graphics, vol. 24, No. 4, Aug. 1990, pp. 273-282.*

* cited by examiner

*Primary Examiner*—Mark Zimmerman
*Assistant Examiner*—Enrique L. Santiago
(74) *Attorney, Agent, or Firm*—Oliff & Berridge, PLC

(57) ABSTRACT

An image generation method includes: generating a two-dimensional image by perspectively transforming a virtual three-dimensional space relative to a predetermined viewpoint at a given instant; determining a corresponding position to a representative point of a waterdrop on the two-dimensional image depending on a position at which the waterdrop exists in the virtual three-dimensional space or a position at which the waterdrop is to be displayed in a display image; determining a reference position on the two-dimensional image corresponding to a vertex or a configuration point which forms the waterdrop, by using reference information relative to the corresponding position to the representative point on the two-dimensional image, the reference information being previously determined for the vertex or the configuration point forming the waterdrop; and linking the determined reference position with the vertex or the configuration point forming the waterdrop and mapping at least a portion of the two-dimensional image onto the waterdrop to generate an image of the waterdrop at a given instant or in a frame proximate to the instant.

34 Claims, 13 Drawing Sheets

320 POSITION OF WATERDROP IN THE GAME IMAGE IS SHOWN

310 TWO-DIMENSIONAL IMAGE DRAWN IN GAME SPACE (BEFORE WATERDROP IS DRAWN)

RANGE TO BE REFLECTED

FINAL IMAGE

IMAGE GENERATION METHOD, PROGRAM AND INFORMATION STORAGE MEDIUM

Japanese Patent Application no. 2001-230077, filed on Jul. 30, 2001, is hereby incorporated by reference in its entirety.

BACKGROUND OF THE INVENTION

The present invention relates to an image generation method, a program and an information storage medium.

In the real world, one may encounter a phenomenon in which when the external world is viewed through a camera having a lens sweated with a waterdrop of rain or plume, the exterior scene is reflected on the waterdrop under refraction of light.

If such a phenomenon is attained in generating an image in a virtual three-dimensional space, for example, in a game system, the refraction of light on a waterdrop can more realistically be represented.

If it is wanted to represent a waterdrop reflecting the external world thereon by faithfully simulating the refraction of light, however, a huge and complicated operation is required to compute and draw the external world to be reflected onto the waterdrop. It is therefore difficult that a game system or other hardware having a limited processing capacity generates images of a waterdrop by simulating the refraction of light in real time.

In addition, the manner of view relating to a waterdrop sweated on the camera lens is complicated variable under the influence of various factors such as changes in the angle of view, focusing and diaphragm of the camera.

A further complicated operation is required to simulate such complicated changes in real time.

BRIEF SUMMARY OF THE INVENTION (1) One embodiment of the present invention relates to an image generation method and a program, comprising:

generating a two-dimensional image by perspectively transforming a virtual three-dimensional space relative to a predetermined viewpoint at a given instant;

determining a corresponding position to a representative point of a waterdrop on the two-dimensional image depending on a position at which the waterdrop exists in the virtual three-dimensional space or a position at which the waterdrop is to be displayed in a display image;

determining a reference position on the two-dimensional image corresponding to a vertex or a configuration point which forms the waterdrop, by using reference information relative to the corresponding position to the representative point on the two-dimensional image, the reference information being previously determined for the vertex or the configuration point forming the waterdrop; and linking the determined reference position with the vertex or the configuration point forming the waterdrop and mapping at least a portion of the two-dimensional image onto the waterdrop to generate an image of the waterdrop at a given instant or in a frame proximate to the instant.

(2) Another embodiment of the present invention relates to an image generation method and a program, comprising:

dynamically changing a setting of at least one of size, transparency, edge transparency and shape of a waterdrop, as an angle of view of a virtual camera changes; and generating an image of the waterdrop in accordance with the setting.

(3) A further embodiment of the present invention relates to an image generation method and a program, comprising:

detecting an event in which the degree of defocusing of a waterdrop is changed, and dynamically changing a setting of at least one of size, transparency, edge transparency and shape of the waterdrop, as an angle of view of a virtual camera changes, based on a content of the detected event; and generating an image of the waterdrop in accordance with the setting.

DETAILED DESCRIPTION OF THE EMBODIMENT

Figure 1:
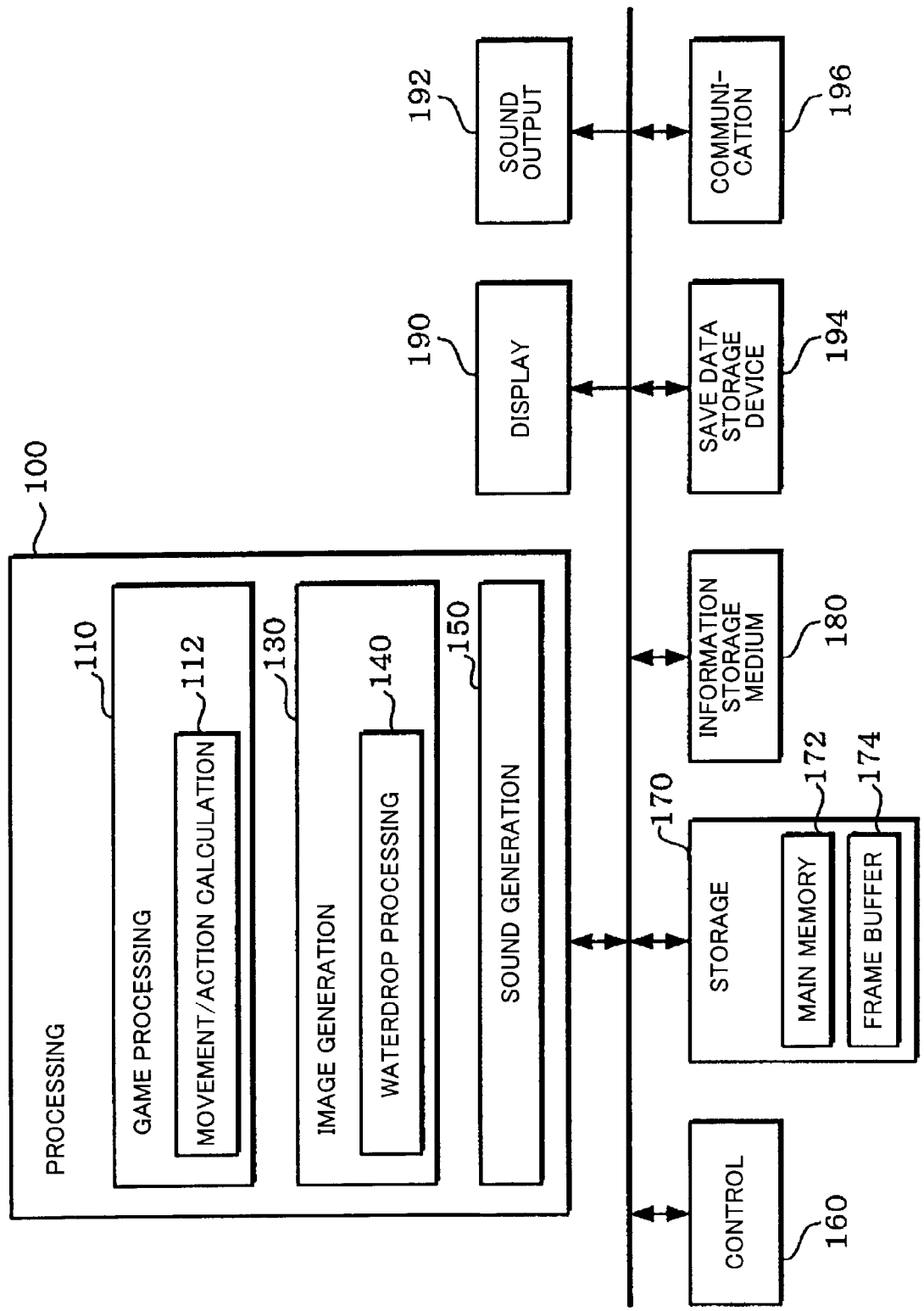
FIG. 1 is a block diagram of a game system according to an embodiment of the present invention.

A preferred embodiment of the present invention will now be described with reference to the drawing.

1. Configuration

Note that the embodiments described hereunder do not in any way limit the scope of the invention defined by the claims laid out herein. Note also that all of the elements of these embodiments should not be taken as essential requirements to the means of the present invention.

(1) An image generation method and a program according to one embodiment of the present invention, comprise:

generating a two-dimensional image by perspectively transforming a virtual three-dimensional space relative to a predetermined viewpoint at a given instant;

determining a corresponding position to a representative point of a waterdrop on the two-dimensional image depending on a position at which the waterdrop exists in the virtual three-dimensional space or a position at which the waterdrop is to be displayed in a display image;

determining a reference position on the two-dimensional image corresponding to a vertex or a configuration point which forms the waterdrop, by using reference information relative to the corresponding position to the representative point on the two-dimensional image, the reference information being previously determined for the vertex or the configuration point forming the waterdrop; and linking the determined reference position with the vertex or the configuration point forming the waterdrop and mapping at least a portion of the two-dimensional image onto the waterdrop to generate an image of the waterdrop at a given instant or in a frame proximate to the instant.

The vertex forming the waterdrop is a vertex in a polygon if the waterdrop is formed by a polygon model, and is a configuration point in a free-form surface if the waterdrop is formed by the free-form surface.

The two-dimensional image may be either of an image as viewed from a virtual camera in a virtual three-dimensional space at a given instant or an image as viewed from a viewpoint different from the virtual camera in the virtual three-dimensional space.

The reference position on the two-dimensional image may be UV coordinates used, for example, when the two-dimensional image is mapped as texture.

According to the present invention, the image of the waterdrop can be generated to reflect the image in the virtual three-dimensional space which changes in real time.

According to this embodiment, the reference position on the two-dimensional image corresponding to a vertex or a configuration point which forms the waterdrop is determined using the previously determined reference information relative to the corresponding position to the representative point in the waterdrop on the two-dimensional image. Therefore, the processing load can greatly be reduced in comparison with the operation of the prior art in which the refraction of light is calculated for the waterdrop and in which image to be reflected on that waterdrop is computed.

(2) In the image generation method and the program of this embodiment, the two-dimensional image may be an image which is viewed from a virtual camera in the virtual three-dimensional space at the given instant.

In this embodiment, for example, an image in a frame buffer as the two-dimensional image, it is not required to generate or provide a particular image for generating an image reflected on the waterdrop. Thus, the image of the waterdrop onto which the image in the virtual three-dimensional space appearance of which changes in real time, is reflected can be generated without increase of the processing load.

(3) In the image generation method and the program of this embodiment, the reference information may have been preset depending on at least one of a shape and lens-like property of the waterdrop.

When at least one of the shape and lens-like nature of the waterdrop changes, the corresponding position of the vertex or the configurations point forming the waterdrop on a two-dimensional image also changes. Thus, reflection onto the waterdrop by refraction of light can be represented more realistically.

(4) In the image generation method and the program of this embodiment, an offset value relative to the corresponding position to the representative point of the waterdrop may be preset as the reference information for the vertex or the configuration point forming the waterdrop, and the offset value may be used to determine the reference position on the two-dimensional image corresponding to the vertex or the configuration point forming the waterdrop.

(5) The image generation method and the program of this embodiment, may comprise moving the waterdrop, and determining the corresponding position to the representative point of the waterdrop based on the position of the moving waterdrop, thereby generating an image to be reflected onto the waterdrop.

Since this embodiment changes the reflected image as the waterdrop moves, it can more realistically represent the movement of the waterdrop.

(6) The image generation method and the program of this embodiment may comprise, when shape of the waterdrop is changed from a first shape to a second shape, generating an image reflected on the waterdrop of the first shape based on a first reference information previously determined for the first shape of the waterdrop; generating an image reflected on the waterdrop of the second shape based on a second reference information previously determined for the second shape of the waterdrop; and generating an image reflected on the waterdrop in a process of changing the shape from the first shape to the second shape, based on the reference information which is obtained by interpolating between the first and second reference information depending on progress of changing.

The image generation method and program may be carried out relative to changing the shape of a single waterdrop, combining a plurality of waterdrops or separating a single waterdrop into droplets.

The shape of waterdrop may be changed, for example, through the morphing technique, but merely by performing an exchange of models. In the later case, it is preferred that the relationship with a vertex before and after deformation has been clarified.

Since this embodiment generates an image reflected on the waterdrop during the progress in which the shape of the waterdrop is changed from the first shape to the second shape, based on reference information which is obtained by interpolating between the first and second reference information depending on the degree of the progress, the shape of the reflected image can smoothly be changed according to the change of the shape of the waterdrop.

(7) The image generation method and the program of this embodiment may comprise a processing of dynamically changing at least one of size, transparency, edge transparency and shape of the waterdrop, as an angle of view of a virtual camera changes.

In this a case, the size of the waterdrop can be increased as the angle of view decreases. Alternatively, the size of the waterdrop can be decreased as the angle of view increases.

The transparency of the waterdrop can be regulated so that the waterdrop will not clearly be viewed as the angle of view decreases or so that the waterdrop will more clearly be viewed as the angle of view increases.

The edge transparency of the waterdrop can be regulated so that the waterdrop edge will less distinctively be viewed as the angle of view decreases or so that the waterdrop edge will more distinctively be viewed as the angle of view increases.

Moreover, the shape of waterdrop can be changed to be proximate to the shape of camera diaphragm or other polygonal shape such as hexagon.

According to this embodiment, the appearance of the waterdrop which changes depending on the change in the angle of view can more realistically be represented.

(8) The image generation method and the program of this embodiment may comprise changing shape of the waterdrop to approximate a polygonal shape or a shape of camera diaphragm, as an angle of view decreases.

(9) An image generation method and a program according to another embodiment of the present invention comprise:

dynamically changing a setting of at least one of size, transparency, edge transparency and shape of a waterdrop, as an angle of view of a virtual camera changes; and generating an image of the waterdrop in accordance with the setting.

In this case, the size of the waterdrop can be increased as the angle of view decreases. Alternatively, the size of the waterdrop can be decreased as the angle of view increases.

The transparency of the waterdrop can be regulated so that the waterdrop will not clearly be viewed as the angle of view decreases or so that the waterdrop will more clearly be viewed as the angle of view increases.

The edge transparency of the waterdrop can be regulated so that the waterdrop edge will less distinctively be viewed as the angle of view decreases or so that the waterdrop edge will more distinctively be viewed as the angle of view increases.

Moreover, the shape of waterdrop can be changed to be proximate to the shape of camera diaphragm or other polygonal shape such as hexagon.

According to this embodiment, the appearance of the waterdrop which changes depending on the change in the angle of view can more realistically be represented.

(10) An image generation method and a program according to a further embodiment of the present invention may comprise:

detecting an event in which the degree of defocusing of a waterdrop is changed, and dynamically changing a setting of at least one of size, transparency, edge transparency and shape of the waterdrop, as an angle of view of a virtual camera changes, based on a content of the detected event; and generating an image of the waterdrop in accordance with the setting.

The event that changes the degree of defocusing in the waterdrop may be an event that produces an image effect such as out-of-focus in camera, changed angle of view or other defocused waterdrop.

In this a case, the size of a waterdrop may be increased as it is defocused while the size of the waterdrop may be reduced as it is made clearer.

The transparency of the waterdrop can be regulated so that the waterdrop will not clearly be viewed as the waterdrop is made defocused or so that the waterdrop will more clearly be viewed as the waterdrop is made clearer.

The edge transparency of the waterdrop can be regulated so that the waterdrop edge will less distinctively be viewed as the waterdrop is made defocused or so that the waterdrop edge will more distinctively be viewed as the waterdrop is made clearer.

Moreover, the shape of waterdrop can be changed to proximate the shape of camera diaphragm or other polygonal shape such as hexagon.

According to this embodiment, the appearance of the waterdrop which changes depending on the change in the degree of defocus can more realistically be represented.

(11) The image generation method and the program of this embodiment may comprise controlling transparency of an edge of the waterdrop independently of transparency of the waterdrop, and generating a defocused image of the waterdrop by changing transparency of the edge so that the edge of the waterdrop becomes inconspicuous.

According to this embodiment, the defocused image of the waterdrop can be represented with less computation load since the edge of the waterdrop can be defocused through a simplified processing.

(12) The image generation method and the program of this embodiment may comprise changing shape of the waterdrop to approximate a polygonal shape or a shape of camera diaphragm, as the angle of view decreases.

(13) The image generation method and the program of this embodiment may comprise generating an image of the waterdrop which has been set as a waterdrop adhered on a camera that takes a virtual three-dimensional image.

According to this embodiment, the appearance of such a waterdrop as have been adhered on a camera taking a game or race can more realistically be represented.

2. Detailed Structure

FIG. 1 shows a block diagram of this embodiment. In this figure, this embodiment may comprise at least a processing section 100. Each of the other blocks may take any suitable form.

The processing section 100 is designed to perform various processings for control of the entire system, commands to the respective blocks in the system, game processing, image processing, sound processing and so on. The function thereof may be realized through any suitable hardware means such as various processors (CPU, DSP and so on) or ASIC (gate array or the like) or a given program (or game program).

A control section 160 is used to input operational data from the player and the function thereof may be realized through any suitable hardware means such as a lever, a button, a housing or the like.

A storage section 170 provides a working area for the processing section 100, communication section 196 and others and functions a main memory 172 and frame buffers 174 (comprising first and second frame buffers). The function thereof may be realized by any suitable hardware means such as RAM.

Information storage medium (which may be a computer-usable storage medium) 180 is designed to store information including programs, data and others. The function thereof may be realized through any suitable hardware means such as optical memory disk (CD or DVD), magneto-optical disk (MO), magnetic disk, hard disk, magnetic tape, memory (ROM) or the like. The processing section 100 performs various processings in the present invention (or this embodiment) based on the information that has been stored in this information storage medium 180. In other words, the information storage medium 180 stores various pieces of information (programs or data) for executing the processings of the present invention (or this embodiment) which are particularly represented by the blocks included in the processing section 100.

Part or the whole of the information stored in the information storage medium 180 will be transferred to the storage section 170 when the system is initially powered on. The information stored in the information storage medium 180 may contain at least one of program code set for processing the present invention, image data, sound data, shape data of objects to be displayed, table data, list data, information for instructing the processings in the present invention, information for performing the processings according to these instructions and so on.

A display section 190 is to output an image generated according to this embodiment and the function thereof can be realized by any suitable hardware means such as CRT, LCD or HMD (Head-Mount Display).

A sound output section 192 is to output a sound generated according to this embodiment and the function thereof can be realized by any suitable hardware means such as speaker.

A save data storage device 194 is to store the player's personal data and save data and may be take any suitable form such as memory card, portable game machine and so on.

The communication section 196 is designed to perform various controls for communication between the game system and any external device (e.g., a host device or another game system). The function thereof may be realized through any suitable hardware means such as various types of processors or communication ASIS or according to any suitable program.

The program or data for executing the means in the present invention (or this embodiment) may be delivered from an information storage medium included in a host device (or server) to the information storage medium 180 through a network and the communication section 196. The use of such an information storage medium in the hose device (or server) falls within the scope of the invention.

The processing section 100 further comprises a game processing section 110, an image generation section 130 and a sound generation section 150.

The game processing section 110 is designed to perform various processings such as a processing for coin (or charge) reception, a processing for setting of various modes, a processing for game proceeding, a processing for setting of scene selection, a processing for determining the position and rotation angle (about X-axis, Y-axis or Z-axis) of an object (which comprises one or more primitive faces), a processing for causing the object to act (motion processing), a processing for determining the view point (or position of a virtual camera) and the angle of view (or rotation angle of the virtual camera), a processing for arranging an object such as map object within an object space, a processing for hit checking, a processing for computing the game results (or scores), a processing for causing a plurality of players to play in a common game space, a processing for various game computations including game-over and other processings, based on operational data from the control section 160 and according to the personal data and game program from the save data storage device 194.

The image generation section 130 is to perform various image processings according to the commands or the like from the game processing section 110. For example, the image generation section 130 may generate an image viewed from a virtual camera (or viewpoint) within the object space and then output it toward the display section 190. The sound generation section 150 is to perform various sound processings according to the commands and the like from the game processing section 110. The sound generation section 150 may generate sounds such as BGMs, sound effects and voices and output them toward the sound output section 192.

All the functions of the game processing section, image generation section and sound generation section (110, 130, 150) may be realized by any suitable hardware means or according to the program. Alternatively, these functions may be realized by both the hardware means and program.

The game processing section 110 further comprises a movement/action calculation section 112.

The movement/action calculation section 112 is to calculate the information of movement (position data and rotation angle data) for objects such as character motorcars and the information of action (position and rotation angle data relating to the respective parts) for the objects. For example, the movement/action calculation section 112 may cause the objects to move and act, based on the operational data inputted by the player through the control section 160 and according to the game program.

More particularly, the movement/action calculation section 112 may determine the position and rotational angle of the object, for example, for each one frame (1/60 seconds). For example, it is now assumed that the position of the object for (k−1) frame is PMk−1, the velocity is VMk−1, the acceleration is Amk−1, time for one frame is Δt. Thus, the position PMk and velocity VMk of the object for k frame can be determined by the following formulas (1) and (2):

$$PMk = PMk-1 + Vmk-1 \times \Delta t \quad (1)$$

$$VMk = VMk-1 + Amk-1 \times \Delta t \quad (2)$$

The image generation section 130 performs various geometry processings (or three-dimensional operations) such as coordinate transformation, clipping, perspective transformation and light-source calculation and a drawing processing for drawing the object (or model) subjected to the geometry processings in a frame buffer.

The image generation section 130 includes a waterdrop processing section 140.

The waterdrop processing section 140 may be designed so as to generate a two-dimensional image in which a virtual three-dimensional space is perspectively transformed into a predetermined viewpoint at a given instant; to determine a corresponding position to the representative point in a waterdrop on the two-dimensional image depending on a position at which a waterdrop exists in the virtual three-dimensional space or a position at which it is desired to display a waterdrop on the display image; to determine the reference corresponding position to each of the vertexes or configuration points forming each waterdrop on the two-dimensional image by using reference information relative to a corresponding position to the representative point on the two-dimensional image, the reference information having previously been determined with respect to each of the vertexes or configuration points forming each waterdrop; and to link the determined reference position with the corresponding one of the vertexes or configuration points forming each waterdrop and to map at least a portion of the two-dimensional image onto the waterdrop for generating the image of a waterdrop in a frame at or near the given instant.

The two-dimensional image may be one that is viewed from a virtual camera in the virtual three-dimensional space at the given instant.

The reference information relative to a corresponding position to the representative point may have previously been set depending on at least one of the shape and lens-like property of the waterdrop.

Furthermore, an offset value relative to a corresponding position to the representative point of each waterdrop may have previously been determined with respect to each of the vertexes or configuration points forming each waterdrop as the reference information. The offset value may be used to determine the reference position on the two-dimensional image which corresponds to each of the vertexes or configuration points forming each waterdrop.

Furthermore, the waterdrop may be moved. Based on the position of the waterdrop being moved, a corresponding position to the representative point of each waterdrop may be determined to generate an image reflected on the waterdrop.

Furthermore, when shape of a given waterdrop is to be changed from the first shape to the second shape, an image reflected on the waterdrop of the first shape may be generated based on the first reference information previously determined relating to the first shape of the waterdrop; an image reflected on the waterdrop may be generated based on the second reference information previously determined relating to the second shape of the waterdrop; and an image reflected on the waterdrop during the progress in which shape of the waterdrop is changed from the first shape to the second shape may be generated based on reference information which is obtained by interpolating between the first and second reference information depending on the degree of the progress.

At least one of various settings such as waterdrop size, waterdrop transparency, waterdrop edge transparency and waterdrop shape may dynamically be changed depending on the variable angle of view in a virtual camera.

The shape of the waterdrop may be changed to approximate a polygon or the shape of camera's aperture as the angle of view decreases.

An event in which the degree of defocusing in the waterdrop is changed may be detected. Based on the contents of the detected event, at least one of various settings such as waterdrop size, waterdrop transparency, waterdrop edge transparency and waterdrop shape may dynamically be changed. The changed setting may be used to generate the image of the waterdrop.

The edge transparency of each waterdrop may be controlled independently of the transparence of that waterdrop itself. The defocused image of the waterdrop may be generated by changing the transparency so that the edge of the waterdrop will not distinctively be viewed.

The game system of this embodiment may be dedicated for a single-player mode in which only a single player can play the game or may have a multi-player mode in which a plurality of players can play the same game.

If a plurality of players play the same game, only a single terminal may be used to generate game images and sounds to be provided to all the players. Alternatively, a plurality of terminals interconnected through a network (transmission lien or communication line) may be used in the present invention to generate game images and sounds to be provided to all the players.

3. Processing of This Embodiment

Processing in this embodiment will be described with reference to the drawing.

Figure 2:
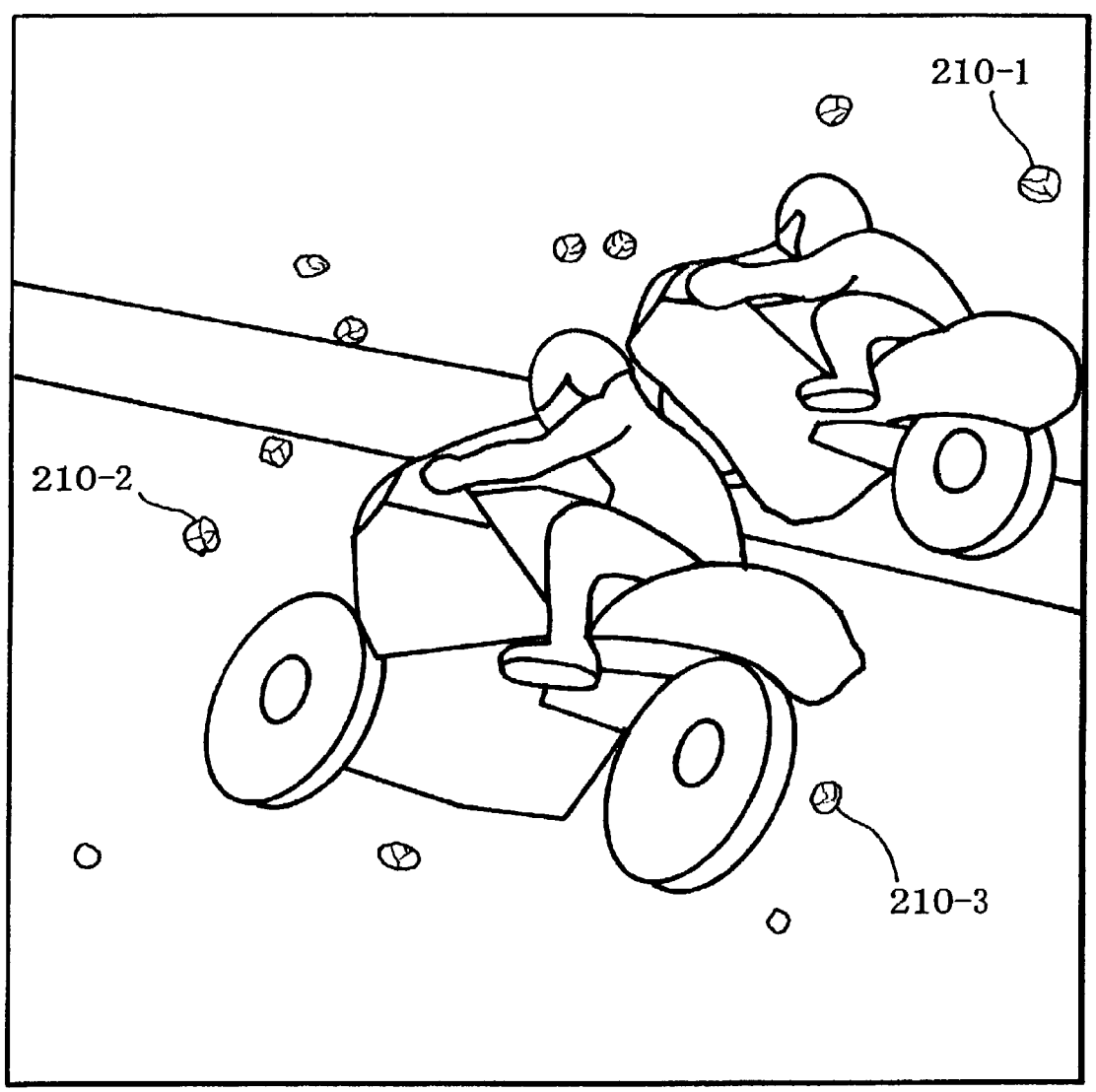
FIG. 2 is one example of a game image in this embodiment.

FIG. 2 is a game image or scene according to this embodiment as viewed through a camera having its lens on which a waterdrop adhered.

This game image represents a number of waterdrops 210-1, 210-2, 210-3 and so on. One of the features of the present invention is that a game space (or virtual three-dimensional space) is reflected onto the waterdrop 210-1, 210-2, 210-3 and so on.

Figure 3:
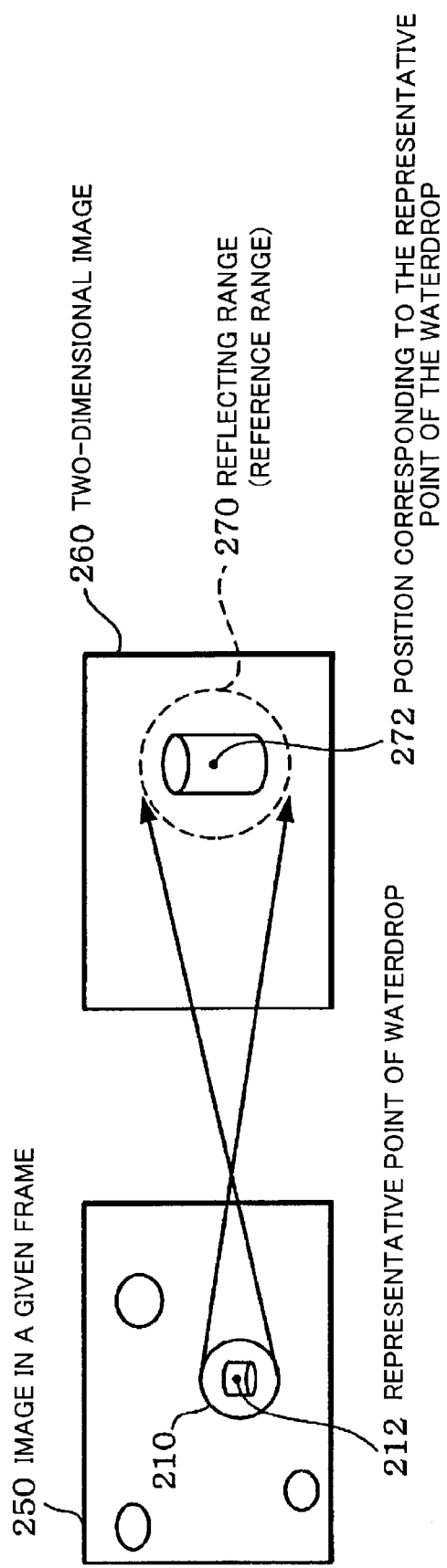
FIG. 3 illustrates the contents of an image reflected on a waterdrop according to this embodiment.

FIG. 3 illustrates the contents of the image reflected on the waterdrop.

Reference numeral 250 denotes an image on which a waterdrop in a frame at or near a given instant are displayed (and which will be called hereinafter as "image of the given frame"). Other reference numeral 260 designates a two-dimensional image in which the virtual three-dimensional space is perspectively transformed into a predetermined viewpoint at a given instant. Such a two-dimensional image may be an image in a frame buffer before the waterdrop area drawn, for example.

If the image in the frame buffer is to be used as the two-dimensional image, this image may be copied into a work buffer wherein the image may be used as a texture image.

Although the background image relative to the image in the given frame is omitted in FIG. 3, the two-dimensional image 260 in the frame buffer may be used as the background image.

When the image of the given frame 250 is synchronized with the two-dimensional image in such a manner, the image to be reflected onto the waterdrop can securely be generated in real time.

According to this embodiment, a range of reflection shown by 270 on the two-dimensional image 260 is reflected on a waterdrop 210 in the image of the given frame 250. This range of reflection (or reference range) 270 is determined on the position, size or lens-like refraction of the waterdrop. The position of the waterdrop used herein may be either of a position at which the waterdrop exists in the virtual three-dimensional space or a position at which it is desired to display the waterdrop on the display image.

The position of the waterdrop may be one that represents the representative point 212 on the waterdrop. A position 272 corresponding to the representative point of the waterdrop on the two-dimensional image 260 is determined on the position of the representative point 212 of the waterdrop on the image of the given frame 250. For example, the position 272 may correspond to the same position on the frame image.

According to this embodiment, reference information relative to the position 272 corresponding to the representative point on the two-dimensional image 260 is used to determine the range of reflection (or reference range).

Figure 4:
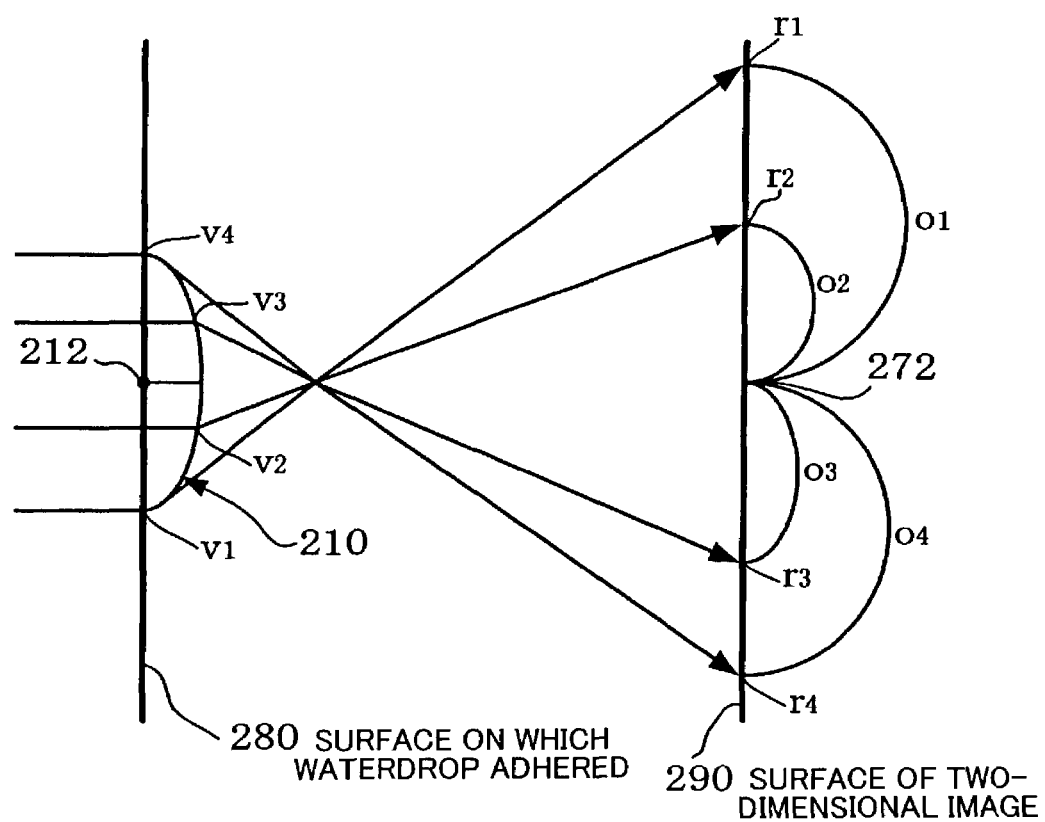
FIG. 4 illustrates reference information relative to positions which correspond to the representative points in this embodiment.

FIG. 4 illustrates the reference information relative to the corresponding position to the representative point in this embodiment.

Reference numerals 280 and 290 represent the appearances of a waterdrop adhered surface (which is the lens surface of a camera herein) and two-dimensional image surface as viewed from the lateral direction, respectively. If it is now assumed that destinations to be referred by vertexes v1, v2, v3 and v4 are respectively r1, r2, r3 and r4, o1, o2, o3 and o4 become reference information relative to the position 272 corresponding to the representative point on the two-dimensional image.

The reference information o1, o2, o3 or o4 relative to the corresponding position to the representative point may be an offset value determined relative to the corresponding position to the representative point of each waterdrop with respect o each of the vertexes v1, v2, v3 and v4.

If it is now assumed that the position 272 corresponding to the representative point of each waterdrop is at (x0, y0); one destination to be referred r1 is at (x1, y1); and o1 is at (ox1, oy1), the following settings can be preset:

$ox1 = x1 - x0$ $oy1 = y1 - y0$

In this case, the calculation for determining the reference information in real time is:

$$x1 = x0 + ox1$$

$$y1 = y0 + oy1$$

According to this embodiment, since the reference information o1, o2, o3 and o4 relative to the corresponding position to the representative point have been preset, any complicated and real time computation of light refraction is not required. Since only the computation of destinations to be referred may be performed in real time based on the positions corresponding to the representative points as well as the reference information, the processing load can greatly be reduced.

Since o1, o2, o3 and o4 are reference information relative to the positions corresponding to the respective representative points, only one type of reference information can have been preset to use relative to any other waterdrop having the same property on the same scene.

Even though a number of waterdrops exist on the same scene, therefore, only one type of reference information can be used, thereby avoiding increase of the amount of information. Furthermore, the complicated computation of light refraction will not be required for the respective one of the waterdrops. Thus, the computation of destination to be referred for each waterdrop may only be carried out in real time based on the respective corresponding position to each representative point as well as the reference information. This enables the processing load to be greatly reduced.

Figure 5A:
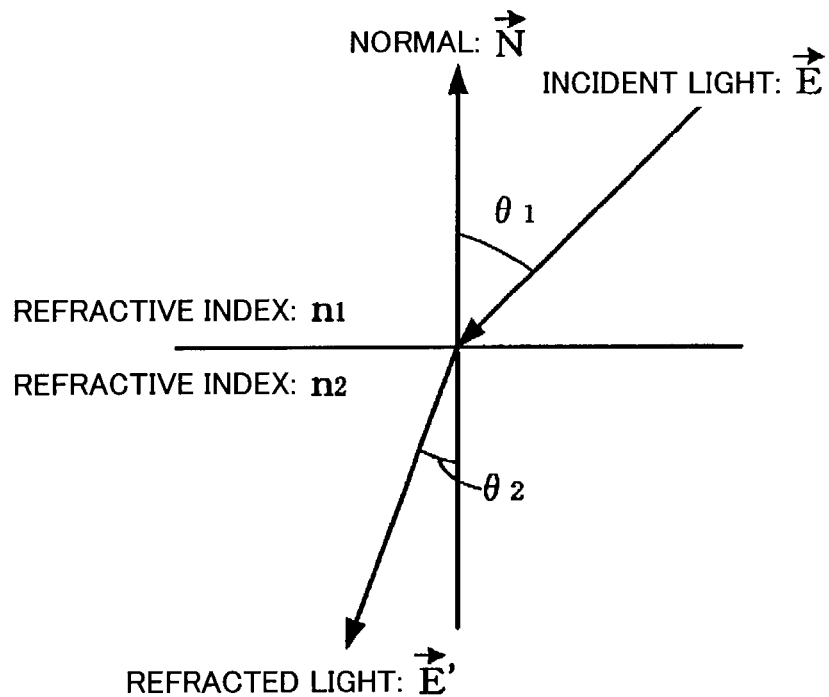
FIGS. 5A and 5B illustrate an example of settings relating to the reference information.
Figure 5B:
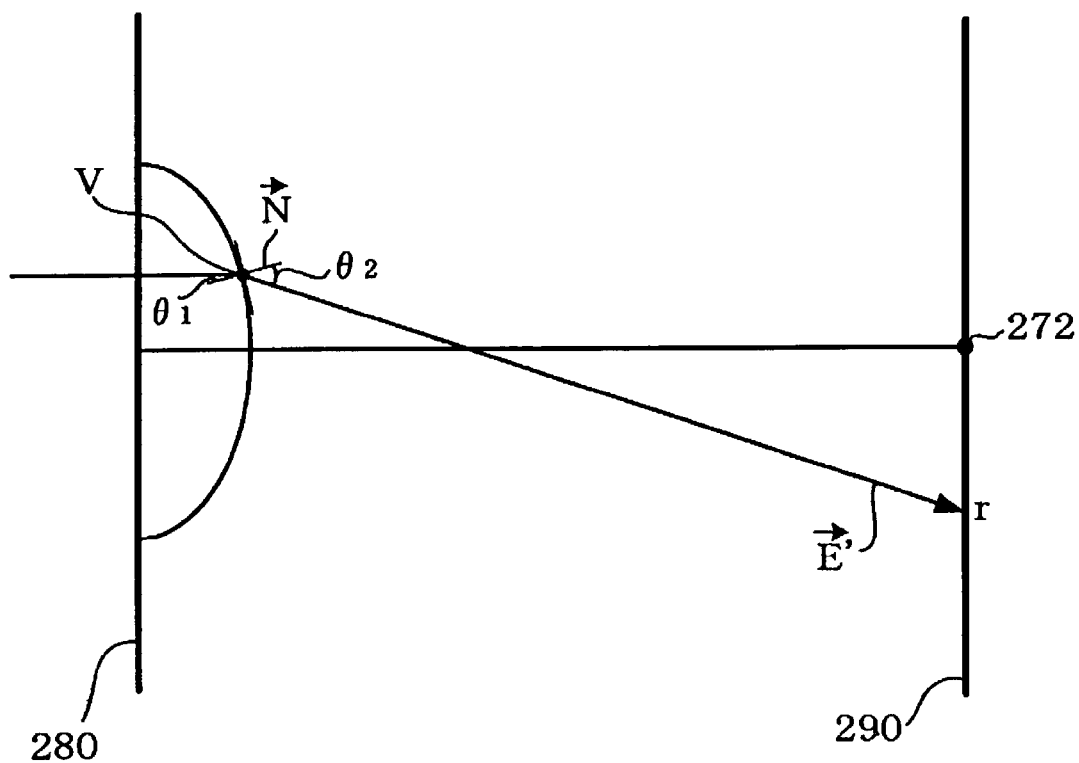

FIGS. 5A and 5B illustrate a setting of reference information.

If it is now assumed that an angle included between the vector of an incident light E and a normal N to the refracting interface within a medium 1 having its refractive index n1 is θ1 and that an angle included between the vector of an incident light E' and the normal N to the refracting interface within a medium 2 having its refractive index n2 is θ2, the following formula is established through Snell's law:

$$n_1 \sin\theta_1 = n_2 \sin\theta_2 \qquad \text{Formula 1}$$

$$\vec{E}' = \frac{n_1}{n_2}\left\{\vec{E} - \vec{N}\left(\frac{n_1}{n_2}\cos\theta_2 - \cos\theta_1\right)\right\}$$

If the refractive index of a waterdrop is equal to the refractive index n1 of the medium 1 and the refractive index n2 of the medium 2 is equal to that of air, the refraction vector E' on the surface of the waterdrop can be determined. Reference destination r relative to v is then determined by suitably setting the two-dimensional plane 290 relative to the refraction vector E', as shown in FIG. 5B.

In such a manner, the reference destination to be reflected can be determined by physically simulating the refraction of light depending on the shape of the waterdrop.

FIGS. 6A, 6B, 7A, 7B and 7C schematically illustrate a manner of generating the images of a waterdrop onto which the game space (or virtual three-dimensional space) is reflected in a given frame.

Figure 6B:
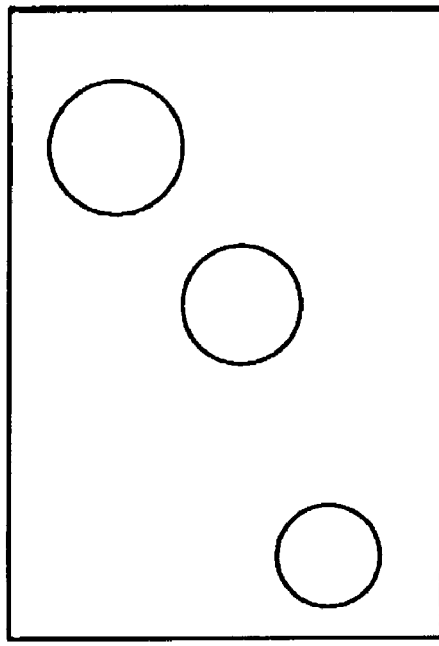
FIGS. 6A and 6B are schematic views showing a manner of generating the images of a waterdrop onto which a game space (or virtual three-dimensional space) is reflected in a given frame.
Figure 6A:
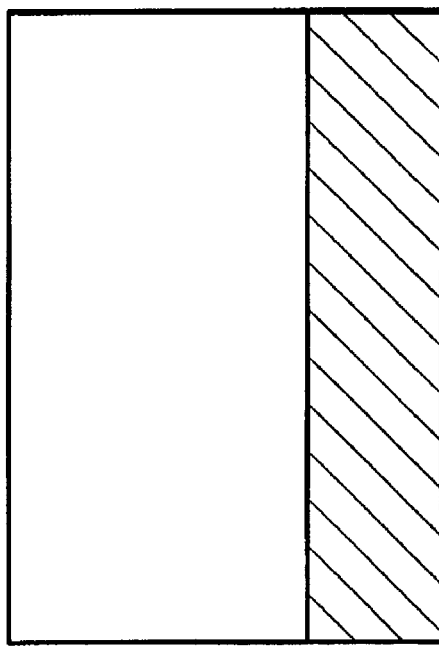

Reference numeral 310 in FIG. 6A denotes a two-dimensional image (before waterdrops are drawn) of the game space which is drawn in a frame buffer or the like. Such a two-dimensional image is used as a texture on mapping. FIG. 6B shows the positions of waterdrops relative to the game image.

Figure 7A:
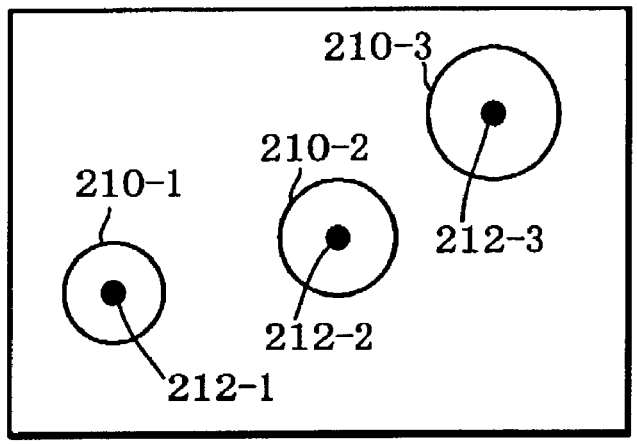
FIGS. 7A, 7B and 7C are continuous from FIGS. 6A and 6B, and schematic views showing the manner of generating the images of a waterdrop onto which a game space (or virtual three-dimensional space) is reflected in a given frame.

FIG. 7A shows the representative points 212-1, 212-2 and 212-3 of the respective waterdrops 210-1, 210-2 and 210-3 in 320.

Figure 7B:
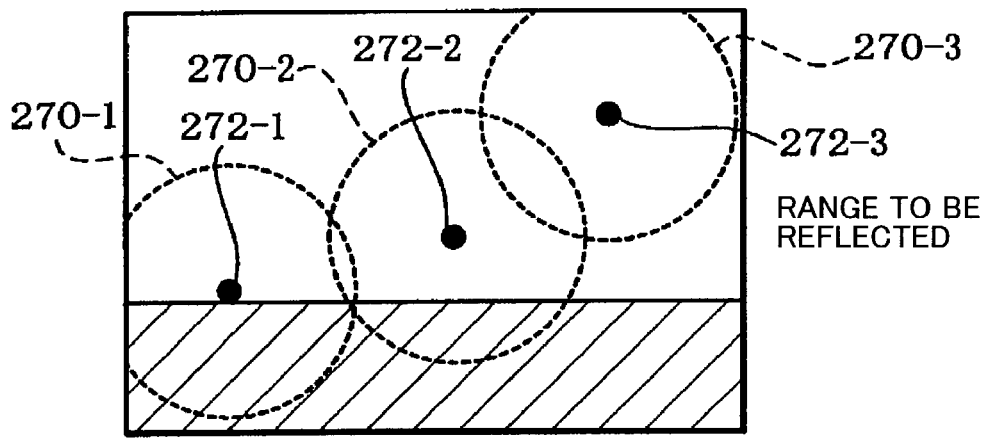

FIG. 7B shows reference ranges for images to be reflected onto the respective waterdrop in 310. Reference numerals 272-1, 272-2 and 272-3 designate positions corresponding to the representative points 212-1, 212-2 and 212-3 (see FIG. 7A) of the respective waterdrops on the two-dimensional image while reference numerals 270-1, 270-2 and 270-3 denote reference ranges for the respective waterdrops on the two-dimensional image.

Figure 7C:
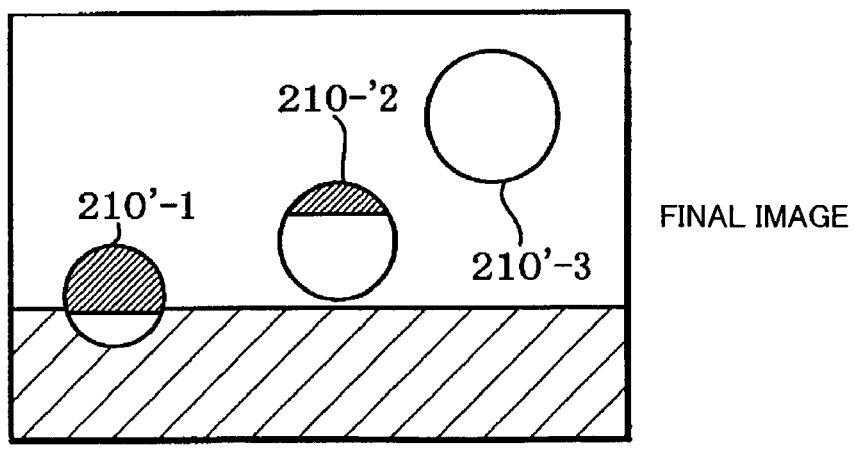

FIG. 7C shows that the waterdrops on each of which the corresponding reference range (see FIG. 7B) is mapped are drawn in the frame buffer or the like in which the two-dimensional image of FIG. 6A has been drawn.

Figure 8:
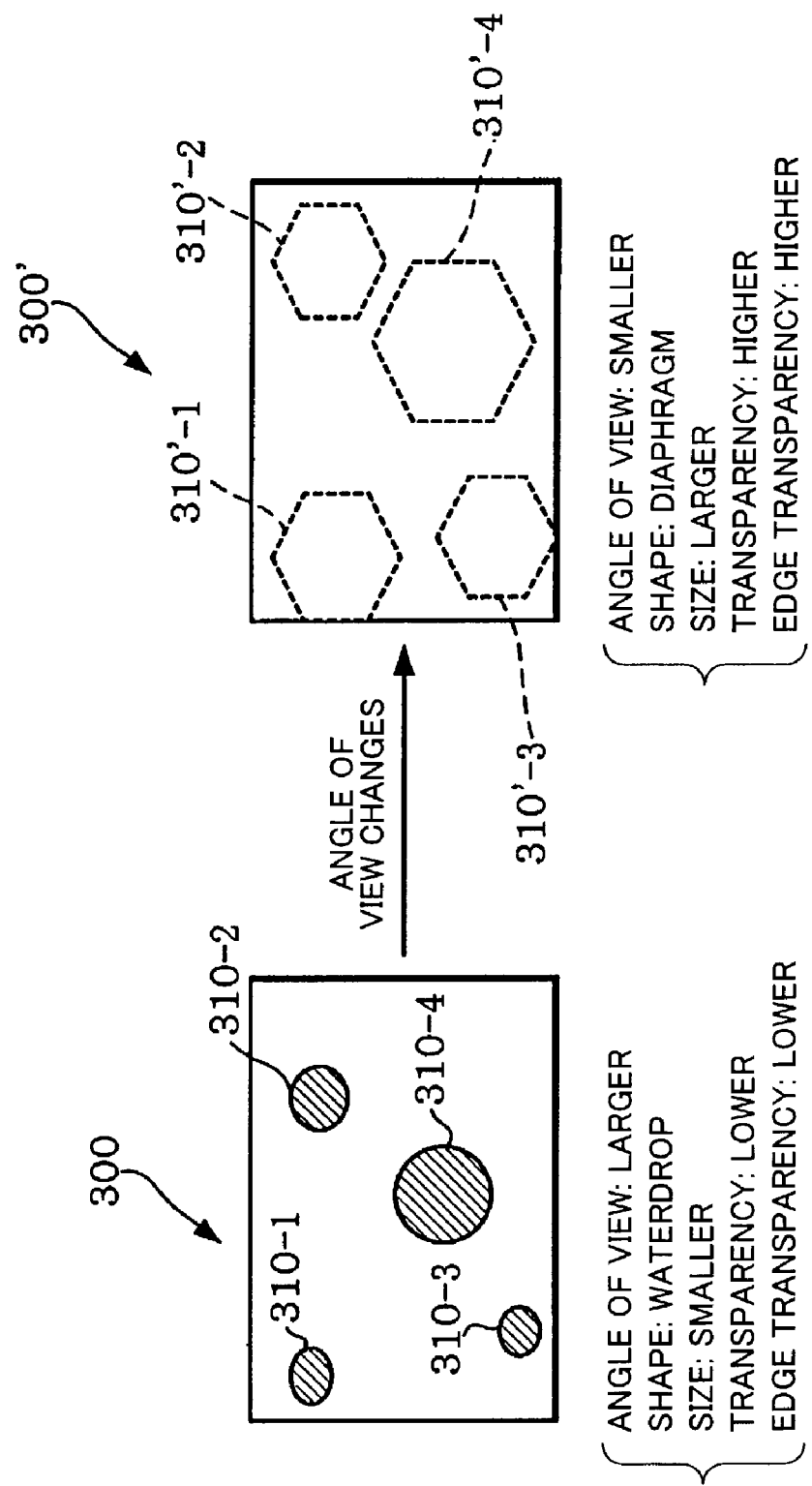
FIG. 8 illustrates the relationship between the changed angel of view in a virtual camera, waterdrop size, waterdrop transparency, waterdrop edge transparency and waterdrop shape.

FIG. 8 illustrates the relationship among the changed angle of view in a virtual camera, the sizes of waterdrops, the transparencies of waterdrops, the edge transparencies of waterdrops and the shapes of waterdrops.

In FIG. 8, reference numeral 300 schematically shows the appearance of the waterdrops in the increased angle of view while 300' shows the appearance of the waterdrops in the reduced angle of view under the same conditions.

This embodiment increases the sizes of the waterdrops when the angle of view in the virtual camera is reduced.

This embodiment also regulates (or increases) the transparency of each waterdrop so that it will hardly be viewed as the angle of view in the virtual camera is reduced.

This embodiment further regulates (or increases) the edge transparency of each waterdrop so that the edge of each waterdrop will be unemphatic as the angle of view in the virtual camera is reduced.

This embodiment further approximates the shape of each waterdrop to the shape of diaphragm in the camera or a polygonal shape such as hexagon or the like as the angle of view in the virtual camera is reduced.

According to the present invention, the manner in which the view of each waterdrop is varied depending on the changed angle of view in the virtual camera can mimetically be represented with less processing load.

Figure 9:
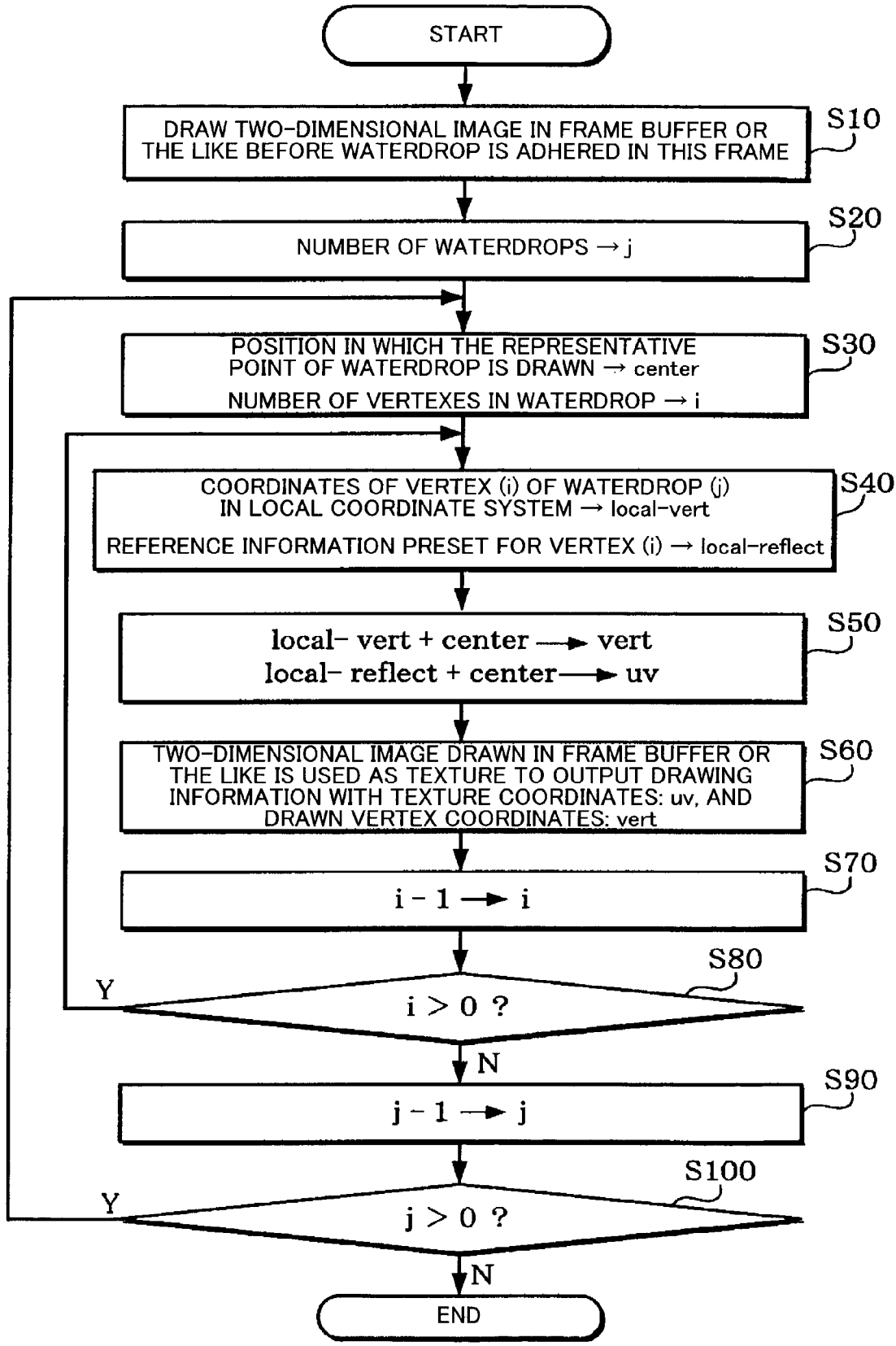
FIG. 9 is a flowchart illustrating a processing of generating the image of a waterdrop onto which the virtual three-dimensional space is reflected in accordance with this embodiment.

FIG. 9 is a flowchart illustrating a processing of generating the image of each waterdrop onto which the virtual three-dimensional space is reflected.

First of all, a two-dimensional image in this frame before waterdrops are adhered thereon is drawn in a frame buffer or the like (step S10). The two-dimensional image may be drawn in a work buffer of VRAM, rather than the frame buffer itself.

Next, the number of waterdrops to be displayed in the scene is set at a variable j (step S20).

Steps S30 to S80 are carried out for each waterdrop.

A position in which the representative point of a waterdrop is to be drawn is first determined. In such a position, the position of the representative point of the waterdrop on the frame buffer is equal to a position on the two-dimensional image which corresponds to the representative point of the waterdrop. The determined position is set at a variable "center" while the number of vertexes in the waterdrop is set at a variable "i" (step S30).

Steps S40 to S80 are repeated until such a procedure has been performed for all the vertexes of each waterdrop.

The coordinates of a vertex (i) of a waterdrop (j) in the local coordinate system are set at "local-vert" while reference information preset for the vertex (i) is set at "local-reflect" (step S40).

Next, "local-vert+center" is set at "vert" while "local-reflect+center" is set at "uv" (step S50). The "vert" is the positional coordinates of the vertex (i) of the waterdrop (j) in the frame buffer or the like. The "uv" is coordinates used when the game image drawn in the frame buffer or the like is to be used as texture.

The two-dimensional image drawn in the frame buffer or the like is then used as texture to output drawing information with the texture coordinates "uv" and drawn vertex coordinates "vert" (step s60).

Next, the value "i" is decremented by one (step S70).

If i is larger than 0, the procedure returns to the step S40 wherein the steps S40 to S30 are repeated for the next vertex (step S80).

If i is not larger than 0, the value "j" is decremented by one (step S90).

If j is larger than 0, the procedure returns to the step S30 wherein the steps S30 to S100 are repeated for the next waterdrop (step S100).

Figure 10:
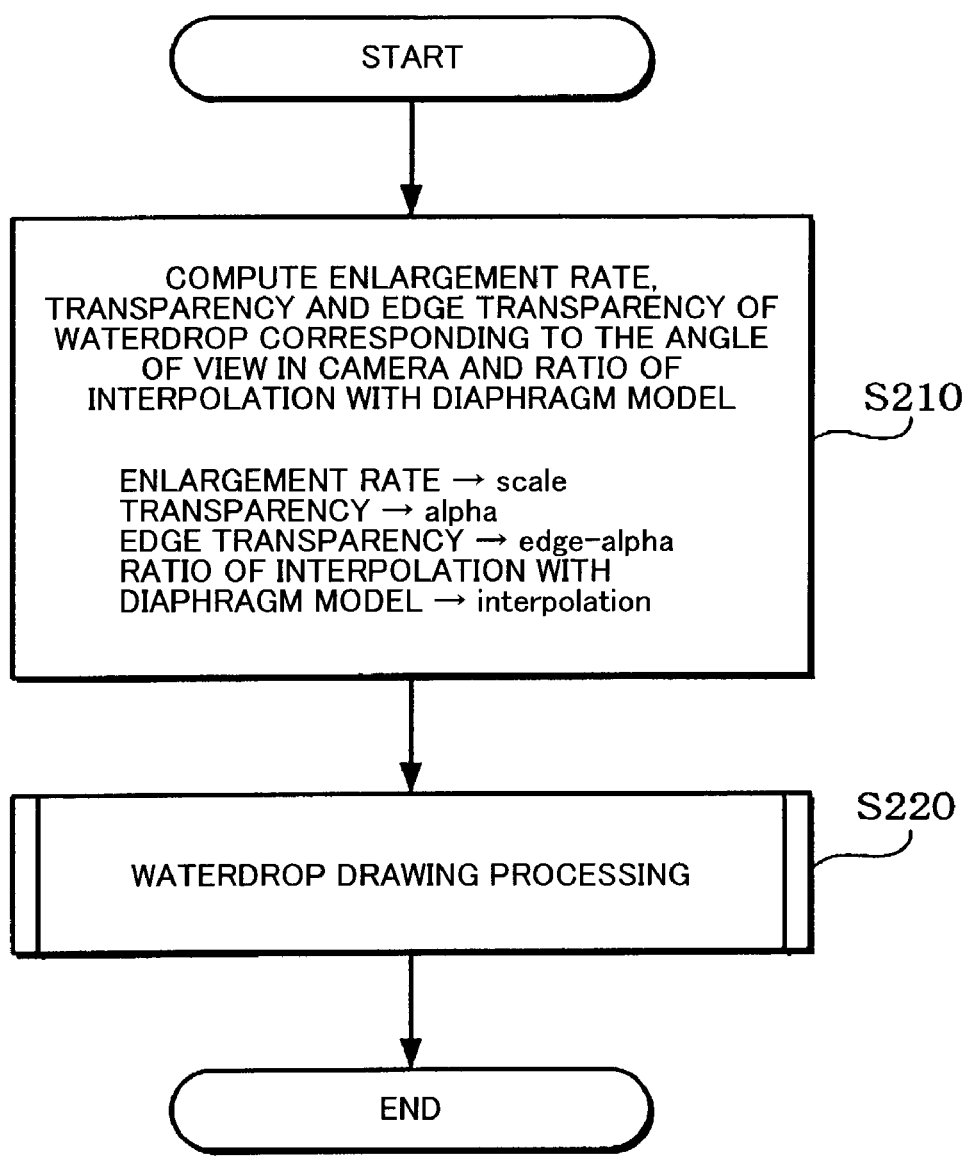
FIG. 10 is a flowchart illustrating a processing of realizing the changes of a waterdrop and an image reflecting thereon depending on the change of the angle of view.
Figure 11:
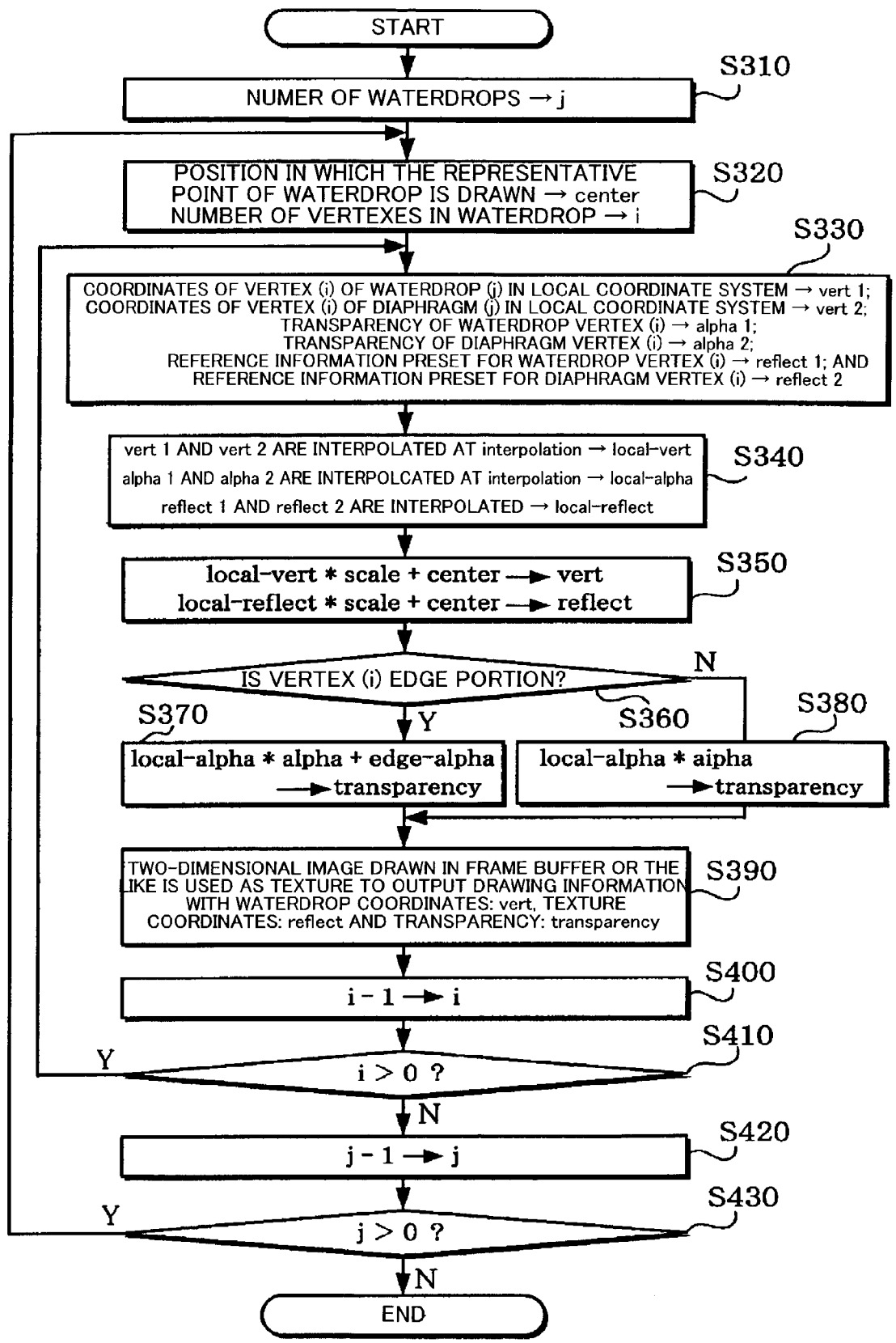
FIG. 11 is a flowchart illustrating a continuation of the flowchart shown in FIG. 10.

FIGS. 10 and 11 are flowcharts for illustrating a processing of changing a waterdrop depending on the varied angle of view and of changing an image reflecting onto the waterdrop. It is assumed herein that the shapes of the waterdrop before and after changed have previously been provided as basic and diaphragm models and that the shape of the waterdrop being changed is determined by interpolation through morphing. The term "diaphragm model" used herein means one that shape of the waterdrop is changed into the diaphragm form of a camera such as hexagon or the like.

First of all, the rate of enlargement, transparency and edge transparency of the waterdrop corresponding to the angle of view in the camera and the ratio of interpolation with the diaphragm model are computed. The computed enlargement rate, transparency, edge transparency and interpolation ratio are then set at "scale", "alpha", "edge-alpha" and "interpolation", respectively (step S210).

These values are then used as arguments to execute the waterdrop drawing processing of a sub-routine (step S220).

The details of the waterdrop drawing processing (see FIG. 11) will be described.

It is now assumed that the two-dimensional image used as texture before it is adhered on the waterdrops has already been drawn in the frame buffer or the like.

First of all, the number of waterdrops to be displayed on the scene is set at a variable "j" (step S310).

Steps S320 to S430 are carried out for each waterdrop.

A position in which the representative point of a waterdrop is to be drawn is first determined. In such a position, the position of the representative point of the waterdrop on the frame buffer is equal to a position on the two-dimensional image which corresponds to the representative point of the waterdrop. The determined position is set at a variable "center" while the number of vertexes in the waterdrop is set at a variable "i".

Steps S330 to S410 are repeated until such a procedure has been performed for all the vertexes of each waterdrop.

The coordinates of a vertex (i) of a waterdrop (i) in the local coordinate system are set at "vert 1"; the coordinates of a vertex (i) of a diaphragm (j) in the local coordinate system are set at "vert 2"; the transparency of the waterdrop vertex (i) is set at "alpha 1"; the coordinates of the diaphragm vertex (i) are set at "alpha 2"; reference information preset for the waterdrop vertex (i) is set at "reflect 1"; and reference information preset for the diaphragm vertex (i) is set at "reflect 2" (step S330).

The values "vert 1" and "vert 2" are then interpolated at "interpolation" and set at "local-vert"; the values "alpha 1" and "alpha 2" are interpolated at "interpolation" and set at "local-alpha"; and the values "reflect 1" and "reflect 2" are interpolated at "interpolation" and set at "local-reflect" (step S340).

A procedure of moving the position of the vertex in the waterdrop (i) (local-vert*scale+center→vert) and a procedure of moving the position of the reference point (local-reflect*scale+center→reflect) are performed (step S350). The value "vert" used herein means the positional coordinates of the vertex (i) of the waterdrop (j) in the frame buffer or the like. The value "reflect" used herein means coordinates used when the game image drawn in the frame buffer or the like is used as texture.

If the vertex (i) is an edge on the waterdrop, the transparency of this vertex is corrected for edge and then set at "transparency" (steps S360 and S370). Such a procedure will be referred to (local-alpha*alpha+edg-alpha→transparency).

If the vertex (i) is not an edge on the waterdrop, the transparency of this vertex is directly set at "transparency" without correcting for edge (steps S360 and S380). Such a procedure will be referred to (local-alpha*alpha→transparency).

The two-dimensional image drawn in the frame buffer or the like is then used as texture to output drawing information with the texture coordinates "reflect", drawn vertex coordinates "vert" and transparency "transparency" (step S390).

The value "i" is then decremented by one (step S400).

If the value "i" is larger than 0, the procedure returns to the step S330 and repeats the steps S330 to S410 for the next vertex (step S410).

If the value "i" is not larger than 0, the value "j" is decremented by one (step S420).

If the value "j" is larger than 0, the procedure returns to the step S320 and repeats the steps S320 to S430 for the next waterdrop (step S430).

Thus, shape of the image reflected on the waterdrop can smoothly be changed while changing shape of the waterdrop, since in connection with the waterdrop being changed from the basic model to the diaphragm model, the interpolation between the reference information of the basic model and the reference information of the diaphragm model is carried out depending on the progress of deformation, the interpolated reference information being then used to generate the image reflected on the waterdrop.

4. Hardware Arrangement

A hardware arrangement which can realize this embodiment is shown in FIG. 11.

A main processor 900 operates to execute various processings such as game processing, image processing, sound processing and other processings according to a program stored in a CD (information storage medium) 982, a program transferred through a communication interface 990 or a program stored in a ROM (information storage medium) 950.

A coprocessor 902 is to assist the processing of the main processor 900 and has a product-sum operator and analog divider which can perform high-speed parallel calculation to execute a matrix (or vector) calculation at high speed. If a physical simulation for causing an object to move or act (motion) requires the matrix calculation or the like, the program running on the main processor 900 instructs (or asks) that processing to the coprocessor 902.

A geometry processor 904 is to perform a geometry processing such as coordinate transformation, perspective transformation, light source calculation, curve formation or the like and has a product-sum operator and analog divider which can perform high-speed parallel calculation to execute a matrix (or vector) calculation at high speed. For example, for the coordinate transformation, perspective transformation or light source calculation, the program running on the main processor 900 instructs that processing to the geometry processor 904.

A data expansion processor 906 is to perform a decoding processing for expanding image and sound compressed data or a processing for accelerating the decoding processing in the main processor 900. In the opening, intermission, ending or game scene, thus, a compressed animation may be displayed through a given image compression processing. The image and sound data to be decoded may be stored in the storage devices including ROM 950 and CD 982 or may externally be transferred through the communication interface 990.

A drawing processor 910 is to draw or render an object constructed by primitive faces such as polygons or curved faces at high speed. On drawing the object, the main processor 900 uses a DMA controller 970 to deliver the object data to the drawing processor 910 and also to transfer a texture to a texture storage section 924, if necessary. Thus, the drawing processor 910 draws the object in a frame buffer 922 at high speed while performing a hidden-surface removal by the use of a Z-buffer or the like, based on the object data and texture. The drawing processor 910 can also perform a-blending (or translucency processing), depth-cueing, mip-mapping, fogging, bi-linear filtering, tri-linear filtering, anti-aliasing, shading and so on. As the image for one frame is written into the frame buffer 922, that image is displayed on a display 912.

A sound processor 930 includes any multi-channel ADPCM sound source or the like to generate high-quality game sounds such as BGMs, sound effects and voices. The generated game sounds are outputted from a speaker 932.

The operational data from a game controller 942, saved data from a memory card 944 and personal data may externally be transferred through a serial interface 940.

ROM 950 has stored a system program and so on. For an arcade game system, the ROM 950 functions as an information storage medium in which various programs have been stored. The RON 950 may be replaced by any suitable hard disk.

RAM 960 is used as a working area for various processors.

The DMA controller 970 controls a DMA transfer between a processor and a memory (RAM, VRAM, ROM, or the like).

The CD drive 980 drives a CD 982 (information storage medium) in which the programs, image data or sound data have been stored and enables these programs and data to be accessed.

The communication interface 990 is to perform data transfer between the image generation system and any external instrument through a network. In such a case, the network connectable with the communication interface 990 may take any of communication lines (analog phone line or ISDN) or high-speed serial bus. The use of the communication line enables the data transfer to be performed through the INTERNET. If the high-speed serial bus is used, the data transfer may be carried out between this game system and any other game system.

All the processings of the present invention may be executed only through hardware or only through a program which has been stored in an information storage medium or which is distributed through the communication interface. Alternatively, they may be executed both through the hardware and program.

If all the processings of the present invention are executed both through the hardware and program, the information storage medium will have stored a program for executing the processings of the present invention through the hardware. More particularly, the aforementioned program instructs the respective processors 902, 904, 906, 910 and 930 which are hardware and also delivers the data to them, if necessary. Each of the processors 902, 904, 906, 910 and 930 will execute the corresponding one of the processings of the present invention based on the instruction and delivered data.

Figure 12:
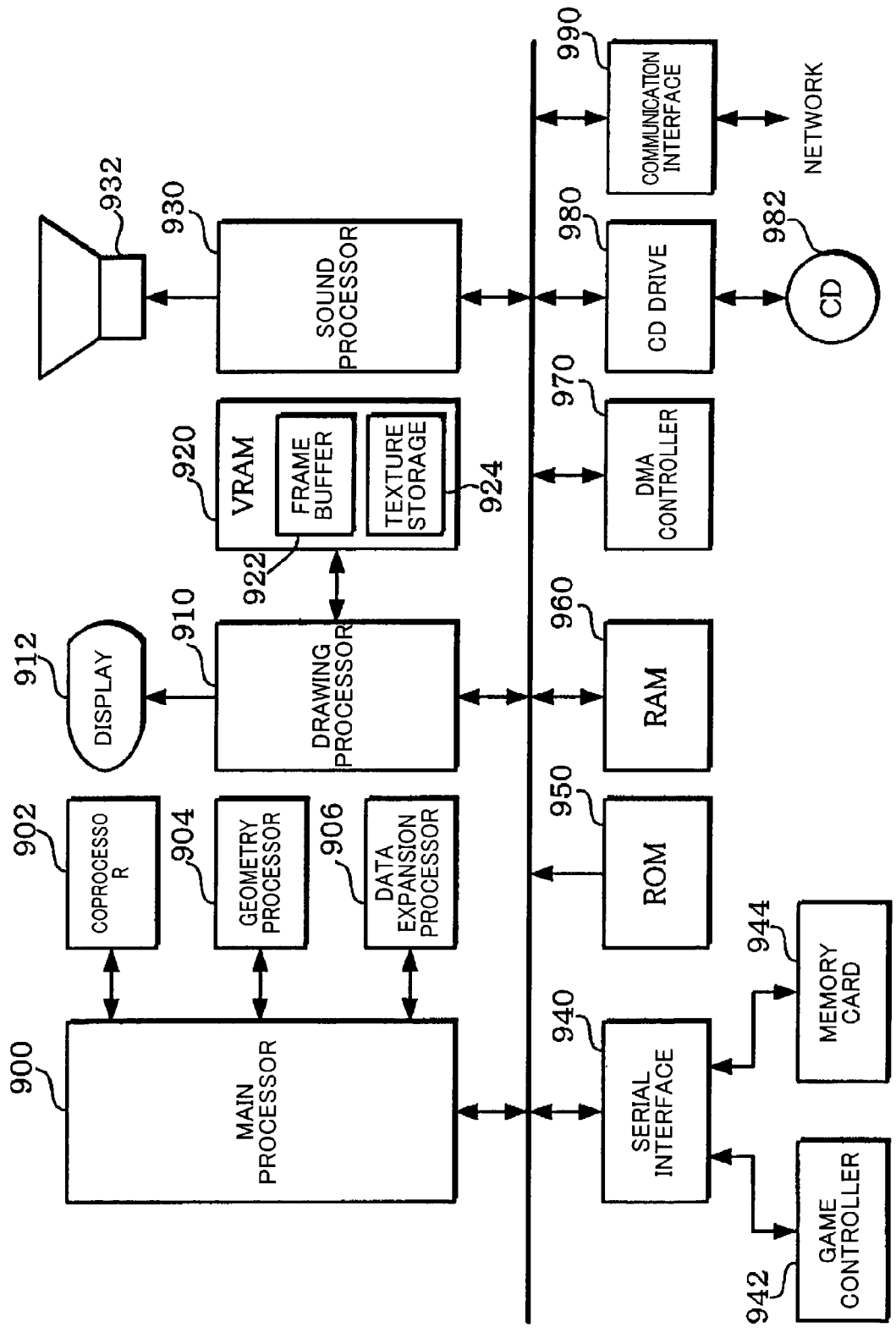
FIG. 12 is a structure of hardware which can realize this embodiment.
Figure 13A:
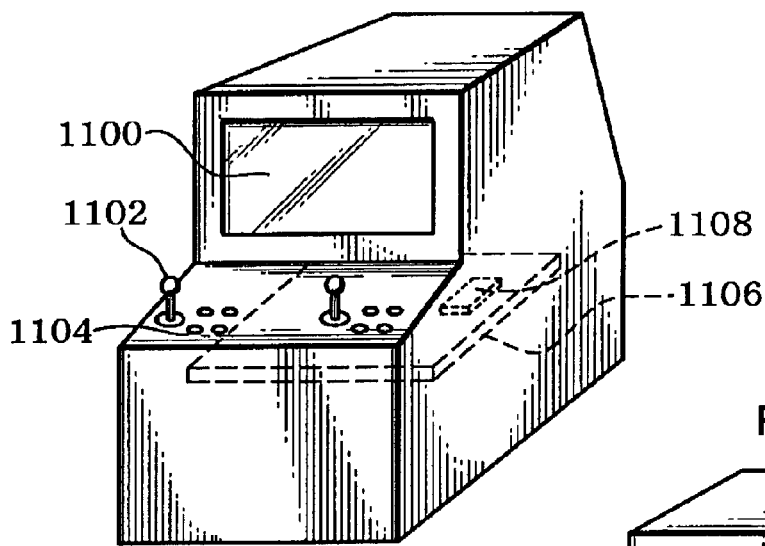
FIGS. 13A, 13B and 13C show various forms of systems to which this embodiment can be applied.
Figure 13B:
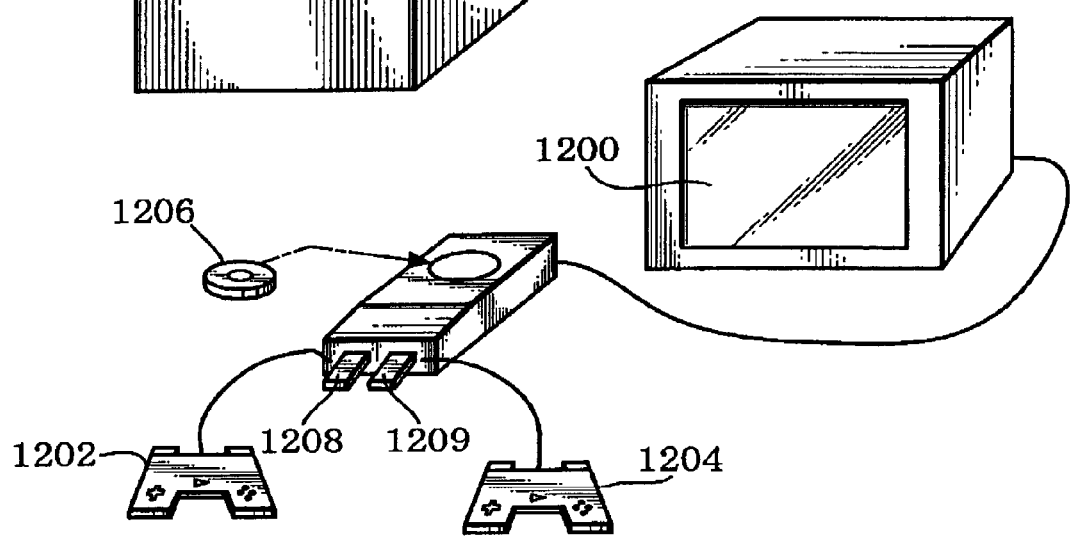
Figure 13C:
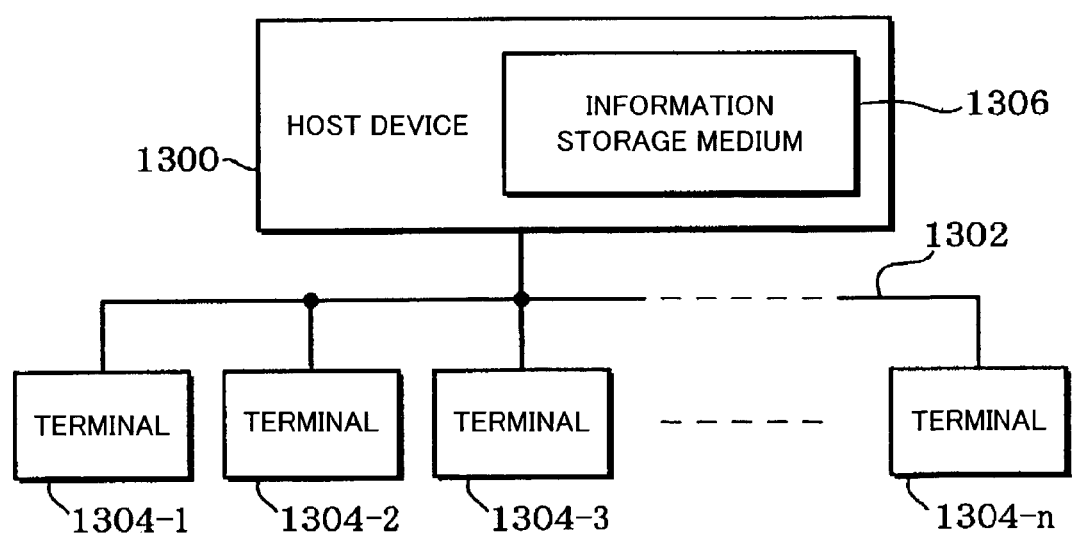

FIG. 12A shows an arcade game system to which this embodiment is applied. Players enjoy a game by controlling levers 1102 and buttons 1104 while viewing a game scene displayed on a display 1100. A system board (circuit board) 1106 included in the game system includes various processor and memories which are mounted thereon. Information (program or data) for executing all the processings of the present invention has been stored in a memory 1108, which is an information storage medium, on the system board 1106. Such information will be referred to "stored information" later.

FIG. 12B shows a home game apparatus to which this embodiment is applied. A player enjoys a game by manipulating game controllers 1202 and 1204 while viewing a game image displayed on a display 1200. In such a case, the aforementioned stored information pieces have been stored in DVD 1206 and memory cards 1208, 1209 which are detachable information storage media in the game system body.

FIG. 12C shows an example wherein this embodiment is applied to a game system which includes a host device 1300 and terminals 1304-1 to 1304-n connected to the host device 1300 through a network (which is a small-scale network such as LAN or a global network such as INTERNET) 1302. In such a case, the above stored information pieces have been stored in an information storage medium 1306 such as magnetic disk device, magnetic tape device, semiconductor memory or the like which can be controlled by the host device 1300, for example. If each of the terminals 1304-1 to 1304-n are designed to generate game images and game sounds in a stand-alone manner, the host device 1300 delivers the game program and other data for generating game images and game sounds to the terminals 1304-1 to 1304-n. On the other hand, if the game images and sounds cannot be generated by the terminals in the stand-alone manner, the host device 1300 will generate the game images and sounds which are in turn transmitted to the terminals 1304-1 to 1304-n.

In the arrangement of FIG. 12C, the processings of the present invention may be decentralized into the host device (or server) and terminals. The aforementioned stored information for realizing the respective processings of the present invention may be distributed and stored into the information storage media of the host device (or server) and terminals.

Each of the terminals connected to the network may be either of home or arcade type. When the arcade game systems are connected to the network, it is desirable that each of the arcade game systems includes a save data storage device (memory card or portable game machine) which can not only transmit the information between the arcade game systems but also transmit the information between the arcade game systems and the home game systems.

The present invention is not limited to the things described in connection with the above forms, but may be carried out in any of various other forms.

For example, the invention relating to one of the dependent claims may not contain part of the structural requirements in any claim to which the one dependent claim belongs. The primary part of the invention defined by one of the independent claim may belong to any other independent claim.

Although this embodiment has been described as to generation of the images of the waterdrops adhered on the camera, the present invention is not limited to such a use. For example, the waterdrops may be adhered on windows in buildings or motorcars or on any other object.

Moreover, the waterdrops may be moved, rather than being stationary. If the waterdrops are moved, a two-dimensional image associated with the vertexes of each waterdrop (e.g., an image drawn in a frame buffer before the waterdrop is drawn) is computed with respect to its reference position to perform the mapping processing, based on the position of the waterdrop in each frame. Therefore, the image reflecting on the waterdrop can be changed as the waterdrop is being moved.

Although this embodiment has been described as to changing of the size, transparency, edge transparency and shape of each waterdrop depending on the varied angle of view in the virtual camera, the present invention is not limited to such a procedure. For example, any event in which the degree of defocusing in each waterdrop is changed due to any factor other than the angle of view may be detected. Based on the contents of the detected event, at least one of the size, transparency, edge transparency and shape of the waterdrop may dynamically be changed.

The present invention may similarly be applied to any of various other games such as fighting games, shooting games, robot combat games, sports games, competitive games, roll-playing games, music playing games, dancing games and so on.

Furthermore, the present invention can be applied to various image generation systems such as arcade game systems, home game systems, large-scaled multi-player attraction systems, simulators, multimedia terminals, system boards for generating game images and so on.

What is claimed is:

1. A method of generating an image, comprising:
generating a two-dimensional image by perspectively transforming a virtual three-dimensional space relative to a predetermined viewpoint at a given instant;
determining a corresponding position to a representative point of a waterdrop on the two-dimensional image depending on a position at which the waterdrop exists in the virtual three-dimensional space or a position at which the waterdrop is to be displayed in a display image;
determining a reference position on the two-dimensional image corresponding to a vertex or a configuration point which forms the waterdrop, by using reference information relative to the corresponding position to the representative point on the two-dimensional image, the reference information being previously determined for the vertex or the configuration point forming the waterdrop; and
linking the determined reference position with the vertex or the configuration point forming the waterdrop and mapping at least a portion of the two-dimensional image onto the waterdrop to generate an image of the waterdrop at a given instant or in a frame proximate to the instant.

2. The method as defined in claim 1,
wherein the two-dimensional image is an image which is viewed from a virtual camera in the virtual three-dimensional space at the given instant.

3. The method as defined in claim 1,
wherein the reference information has been preset depending on at least one of a shape and lens-like property of the waterdrop.

4. The method as defined in claim 1,
wherein an offset value relative to the corresponding position to the representative point of the waterdrop is preset as the reference information for the vertex or the configuration point forming the waterdrop, and the offset value is used to determine the reference position on the two-dimensional image corresponding to the vertex or the configuration point forming the waterdrop.

5. The method as defined in claim 1, comprising:
moving the waterdrop, and determining the corresponding position to the representative point of the waterdrop based on the position of the moving waterdrop, thereby generating an image to be reflected onto the waterdrop.

6. The method as defined in claim 1, comprising:
when shape of the waterdrop is changed from a first shape to a second shape, generating an image reflected on the waterdrop of the first shape based on a first reference information previously determined for the first shape of the waterdrop; generating an image reflected on the waterdrop of the second shape based on a second reference information previously determined for the second shape of the waterdrop; and generating an image reflected on the waterdrop in a process of changing the shape from the first shape to the second shape, based on the reference information which is obtained by interpolating between the first and second reference information depending on progress of changing.

7. The method as defined in claim 1, further comprising:
a processing of dynamically changing at least one of size, transparency, edge transparency and shape of the waterdrop, as an angle of view of a virtual camera changes.

8. The method as defined in claim 1, comprising:
changing shape of the waterdrop to approximate a polygonal shape or a shape of camera diaphragm, as an angle of view decreases.

9. A method of generating an image, comprising:
dynamically changing a setting of at least one of size, transparency, edge transparency and shape of a waterdrop, as an angle of view of a virtual camera changes; and
generating and displaying an image of the waterdrop in accordance with the setting.

10. A method of generating an image, comprising:
detecting an event in which the degree of defocusing of a waterdrop is changed, and dynamically changing a setting of at least one of size, transparency, edge transparency and shape of the waterdrop, as an angle of view of a virtual camera changes, based on a content of the detected event; and
generating and displaying an image of the waterdrop in accordance with the setting.

11. The method as defined in claim 9, comprising:
controlling transparency of an edge of the waterdrop independently of transparency of the waterdrop, and generating a defocused image of the waterdrop by changing transparency of the edge so that the edge of the waterdrop becomes inconspicuous.

12. The method as defined in claim 10, comprising:
controlling transparency of an edge of the waterdrop independently of transparency of the waterdrop, and generating a defocused image of the waterdrop by changing transparency of the edge so that the edge of the waterdrop becomes inconspicuous.

13. The method as defined in claim 9, comprising:
changing shape of the waterdrop to approximate a polygonal shape or a shape of camera diaphragm, as the angle of view decreases.

14. The method as defined in claim 10, comprising:
changing shape of the waterdrop to approximate a polygonal shape or a shape of camera diaphragm, as the angle of view decreases.

15. The method as defined in claim 1, comprising:
generating an image of the waterdrop which has been set as a waterdrop adhered on a camera that takes a virtual three-dimensional image.

16. The method as defined in claim 9, comprising:
generating an image of the waterdrop which has been set as a waterdrop adhered on a camera that takes a virtual three-dimensional image.

17. The method as defined in claim 10, comprising:
generating an image of the waterdrop which has been set as a waterdrop adhered on a camera that takes a virtual three-dimensional image.

18. A program for a computer stored on a computer readable medium to realize processings of:
generating a two-dimensional image by perspectively transforming a virtual three-dimensional space relative to a predetermined viewpoint at a given instant;
determining a corresponding position to a representative point of a waterdrop on the two-dimensional image depending on a position at which the waterdrop exists in the virtual three-dimensional space or a position at which the waterdrop is to be displayed in a display image;
determining a reference position on the two-dimensional image corresponding to a vertex or a configuration point which forms the waterdrop, by using reference information relative to the corresponding position to the representative point on the two-dimensional image, the reference information being previously determined for the vertex or the configuration point forming the waterdrop; and
linking the determined reference position with the vertex or the configuration point forming the waterdrop and mapping at least a portion of the two-dimensional image onto the waterdrop to generate and display an image of the waterdrop at a given instant or in a frame proximate to the instant.

19. The program as defined in claim 18,
wherein the two-dimensional image is an image which is viewed from a virtual camera in the virtual three-dimensional space at the given instant.

20. The program as defined in claim 18,
wherein the reference information has been preset depending on at least one of a shape and lens-like property of the waterdrop.

21. The program as defined in claim 18,
wherein an offset value relative to the corresponding position to the representative point of the waterdrop is preset as the reference information for the vertex or the configuration point forming the waterdrop, and the offset value is used to determine the reference position on the two-dimensional image corresponding to the vertex or the configuration point forming the waterdrop.

22. The program as defined in claim 18,
wherein the waterdrop is moved, and the corresponding position to the representative point of the waterdrop is determined based on the position of the moving waterdrop, thereby generating an image to be reflected onto the waterdrop.

23. The program as defined in claim 18,
wherein when shape of the waterdrop is changed from a first shape to a second shape, an image reflected on the waterdrop of the first shape is generated based on a first reference information previously determined for the first shape of the waterdrop; an image reflected on the waterdrop of the second shape is generated based on a second reference information previously determined for the second shape of the waterdrop; and an image reflected on the waterdrop is generated in a process of changing the shape from the first shape to the second shape, based on the reference information which is obtained by interpolating between the first and second reference information depending on progress of changing.

24. The program as defined in claim 18, further comprising:
causing a computer to realize a processing of dynamically changing at least one of size, transparency, edge transparency and shape of the waterdrop, as an angle of view of a virtual camera changes.

25. The program as defined in claim 18,
wherein shape of the waterdrop is changed to approximate a polygonal shape or a shape of camera diaphragm, as an angle of view decreases.

26. A program for a computer stored on a computer readable medium to realize processings of:
dynamically changing a setting of at least one of size, transparency, edge transparency and shape of a waterdrop, as an angle of view of a virtual camera changes; and
generating and displaying an image of the waterdrop in accordance with the setting.

27. A program for a computer stored on a computer readable medium to realize processings of:
detecting an event in which the degree of defocusing of a waterdrop is changed, and dynamically changing a setting of at least one of size, transparency, edge transparency and shape of the waterdrop, as an angle of view of a virtual camera changes, based on a content of the detected event; and
generating and displaying an image of the waterdrop in accordance with the setting.

28. The program as defined in claim 26,
wherein transparency of an edge of the waterdrop is controlled independently of transparency of the waterdrop, and generating a defocused image of the waterdrop by changing transparency of the edge so that the edge of the waterdrop becomes inconspicuous.

29. The program as defined in claim 27,
wherein transparency of an edge of the waterdrop is controlled independently of transparency of the waterdrop, and generating a defocused image of the waterdrop by changing transparency of the edge so that the edge of the waterdrop becomes inconspicuous.

30. The program as defined in claim 26,
wherein shape of the waterdrop is changed to approximate a polygonal shape or a shape of camera diaphragm, as the angle of view decreases.

31. The program as defined in claim 27,
wherein shape of the waterdrop is changed to approximate a polygonal shape or a shape of camera diaphragm, as the angle of view decreases.

32. The program as defined in claim 18,
wherein an image of the waterdrop is generated, the water drop being set as a waterdrop adhered on a camera that takes a virtual three-dimensional image.

33. The program as defined in claim 26,
wherein an image of the waterdrop is generated, the water drop being set as a waterdrop adhered on a camera that takes a virtual three-dimensional image.

34. The program as defined in claim 27,
wherein an image of the waterdrop is generated, the water drop being set as a waterdrop adhered on a camera that takes a virtual three-dimensional image.

\* \* \* \* \*